(12) United States Patent
Kremer et al.

(10) Patent No.: US 10,605,392 B2
(45) Date of Patent: Mar. 31, 2020

(54) HOSE COUPLER

(71) Applicant: CAMPBELL FITTINGS, INC., Boyertown, PA (US)

(72) Inventors: Randi Kremer, Barto, PA (US); Joshua Leofsky, Hamburg, PA (US)

(73) Assignee: CAMPBELL FITTINGS, INC., Boyertown, PA (US)

( * ) Notice: Subject to any disclaimer, the term of this patent is extended or adjusted under 35 U.S.C. 154(b) by 338 days.

(21) Appl. No.: 15/043,681

(22) Filed: Feb. 15, 2016

(65) Prior Publication Data
US 2016/0238169 A1    Aug. 18, 2016

Related U.S. Application Data

(60) Provisional application No. 62/116,743, filed on Feb. 16, 2015.

(51) Int. Cl.
*F16L 33/00* (2006.01)
*F16L 33/207* (2006.01)

(52) U.S. Cl.
CPC ................. *F16L 33/2075* (2013.01)

(58) Field of Classification Search
CPC ................ F16L 33/2075; F16L 33/2073
See application file for complete search history.

(56) References Cited

U.S. PATENT DOCUMENTS

| | | | |
|---|---|---|---|
| 2,476,480 A | 7/1949 | Burckle | |
| 3,347,571 A | 10/1967 | New | |
| 3,711,131 A | 1/1973 | Evans | |
| 4,111,469 A | 9/1978 | Kavick | |
| 4,369,992 A | 1/1983 | Fournier | |
| 6,764,106 B1 * | 7/2004 | Smith | F16L 33/2073 285/256 |
| 8,439,405 B2 | 5/2013 | Trujillo | |
| 2004/0032124 A1 * | 2/2004 | Lefere | F16L 33/2071 285/242 |
| 2010/0117355 A1 * | 5/2010 | Lamontia | F16L 33/2073 285/222.2 |

FOREIGN PATENT DOCUMENTS

| | | | | |
|---|---|---|---|---|
| CA | 2007954 | | 10/2001 | |
| DE | 1273931 B | * | 7/1968 | .......... F16L 33/2076 |
| DE | 2234632 A1 | * | 1/1974 | .............. F16L 33/01 |
| DE | 10126429 A1 | * | 12/2002 | ........... F16L 11/112 |

(Continued)

*Primary Examiner* — Anna M Momper
*Assistant Examiner* — James A Linford
(74) *Attorney, Agent, or Firm* — RatnerPrestia

(57) ABSTRACT

A hose coupler generally includes a hose adapter including opposing ends, an interior surface forming a fluid passage between the opposed ends, and an exterior surface including a series of barbs for engaging an interior surface of a hose that is configured to be fluidly connected to the hose adapter. A ferrule is connected to the hose adapter and is positioned to at least partially surround the exterior surface of the hose adapter. The ferrule has an interior surface facing the exterior surface of the hose adapter. The interior surface defines at least one cutting rib having a sharp corner or edge for piercing an outer layer of the hose and a plurality of compression ribs each defining a rounded surface for compressing the hose against the barbs.

23 Claims, 4 Drawing Sheets

(56) References Cited

FOREIGN PATENT DOCUMENTS

| | | | | |
|---|---|---|---|---|
| DE | 10246226 | A1 * | 4/2004 | .......... F16L 33/2076 |
| DE | 102014212031 | A1 * | 12/2015 | .......... F16L 33/2073 |
| EP | 0109270 | | 5/1984 | |
| EP | 2213927 | A1 * | 8/2010 | .......... F16L 33/2076 |
| FR | 1136935 | | 5/1957 | |
| GB | 002022744 | A * | 12/1979 | .......... F16L 33/2073 |

* cited by examiner

HOSE COUPLER

CROSS-REFERENCE TO RELATED APPLICATIONS

This application claims priority to U.S. Provisional Patent Application No. 62/116,743, filed Feb. 16, 2015, the entirety of which is incorporated by reference herein.

FIELD OF THE INVENTION

This invention relates to couplings for flexible hoses.

BACKGROUND OF THE INVENTION

This invention relates generally to a coupling member that is to be installed on the end of a hose. As is described in U.S. Pat. No. 4,111,469 to Kavick, which is incorporated by reference herein in its entirety, the coupling member is securely installed on the end of the hose such that it will not become detached in service. The coupling member includes a hose adapter having a nipple or stem portion that is adapted to be inserted into the bore of the hose. A substantially concentric ferrule surrounds the hose adapter such that an annular space is formed between the ferrule and the hose adapter. The annular space is sized to receive the hose. After the end of the hose is loosely positioned in the annular space, the coupling member is placed in a swaging apparatus which reduces the diameter of the ferrule, thereby compressing the hose wall between the ferrule and the nipple of the hose adapter. The coupling member may be threaded or provided with other means for connection to another device.

SUMMARY OF THE INVENTION

A hose coupler generally includes a hose adapter including opposing ends, an interior surface forming a fluid passage between the opposed ends, and an exterior surface including a series of barbs for engaging an interior surface of a hose that is configured to be fluidly connected to the hose adapter. A ferrule is connected to the hose adapter and is positioned to at least partially surround the exterior surface of the hose adapter. The ferrule has an interior surface facing the exterior surface of the hose adapter. The interior surface of the ferrule defines at least one cutting rib having a sharp corner or edge for piercing an outer layer of the hose and a plurality of compression ribs each defining a rounded surface for compressing the hose against the barbs.

BRIEF DESCRIPTION OF THE DRAWING FIGURES

DETAILED DESCRIPTION OF THE INVENTION

As used herein, the term 'fluid' encompasses gasses, liquids and/or partial solids.

Figure 1:
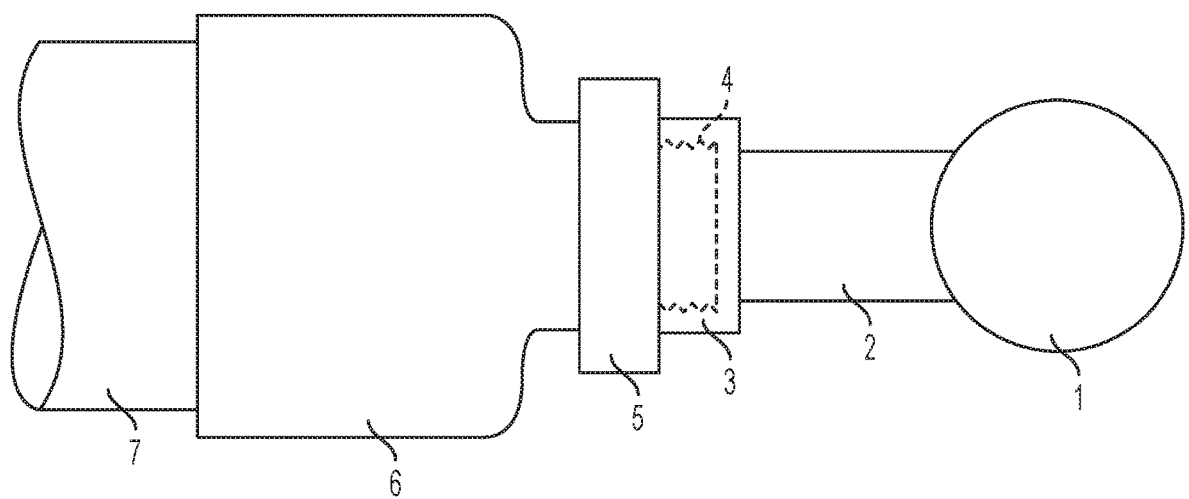
FIG. 1 depicts a schematic view of a hose connection in accordance with an exemplary embodiment of the present invention.

FIG. 1 depicts a schematic view of an exemplary hose connection including a coupler. As shown in FIG. 1, a fluid source 1 is connected to a hose 2. The hose 2 has a threaded female connector 3 on one end thereof. The female threaded connector 3 is threadedly connected to a threaded male connector 4 (shown in broken lines) of a hose coupler 5. The hose coupler 5 includes a ferrule 6, which is crimped to another hose 7. In operation, fluid travels from the fluid source 1, through the hose 2, through the hose coupler 5 and into the hose 7. It should be understood that the exemplary hose connection shown in the schematic view is provided for reference purposes only, and the hose coupler 5 (also referred to herein as a 'coupler') that is described herein is not limited to forming part of the exemplary hose connection.

Figure 2A:
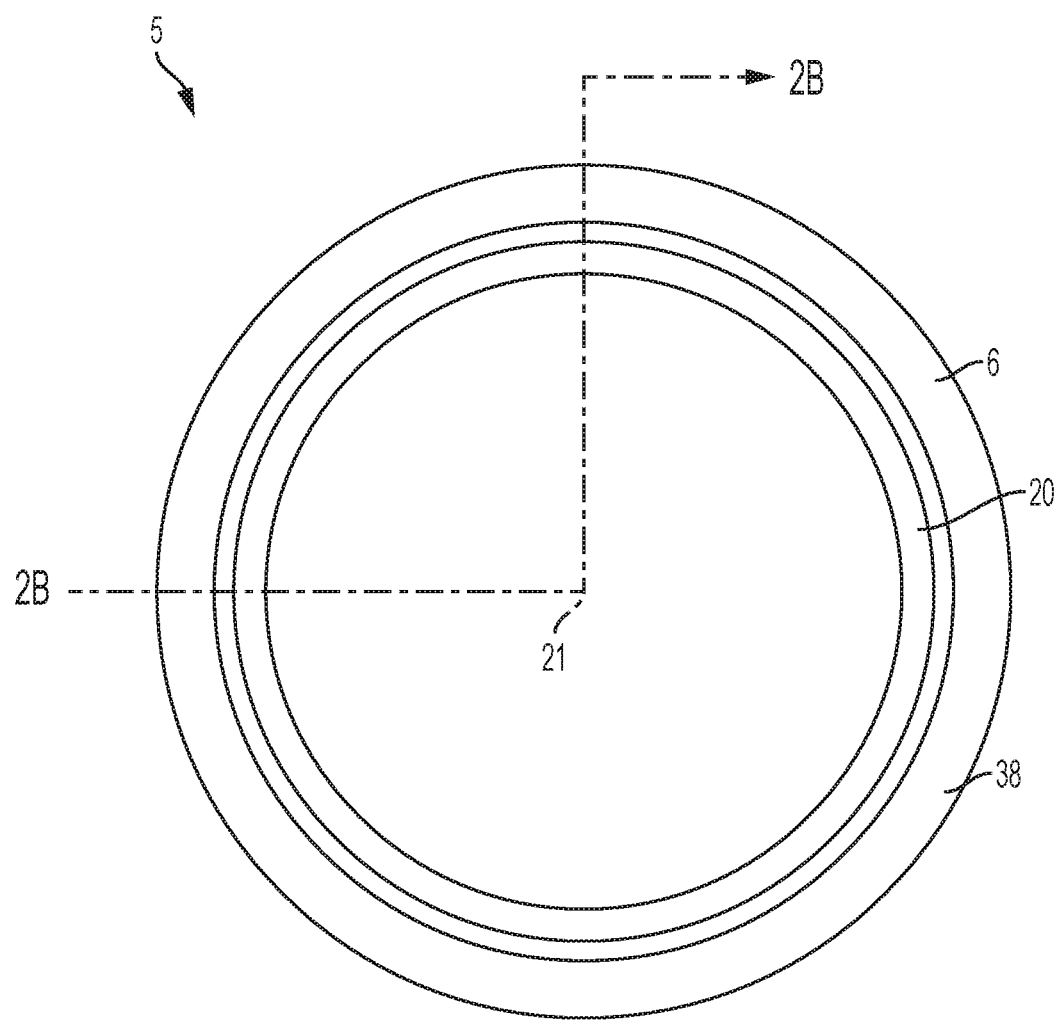
FIG. 2A depicts a bottom plan view of a coupler of the hose connection of FIG. 1.
Figure 2B:
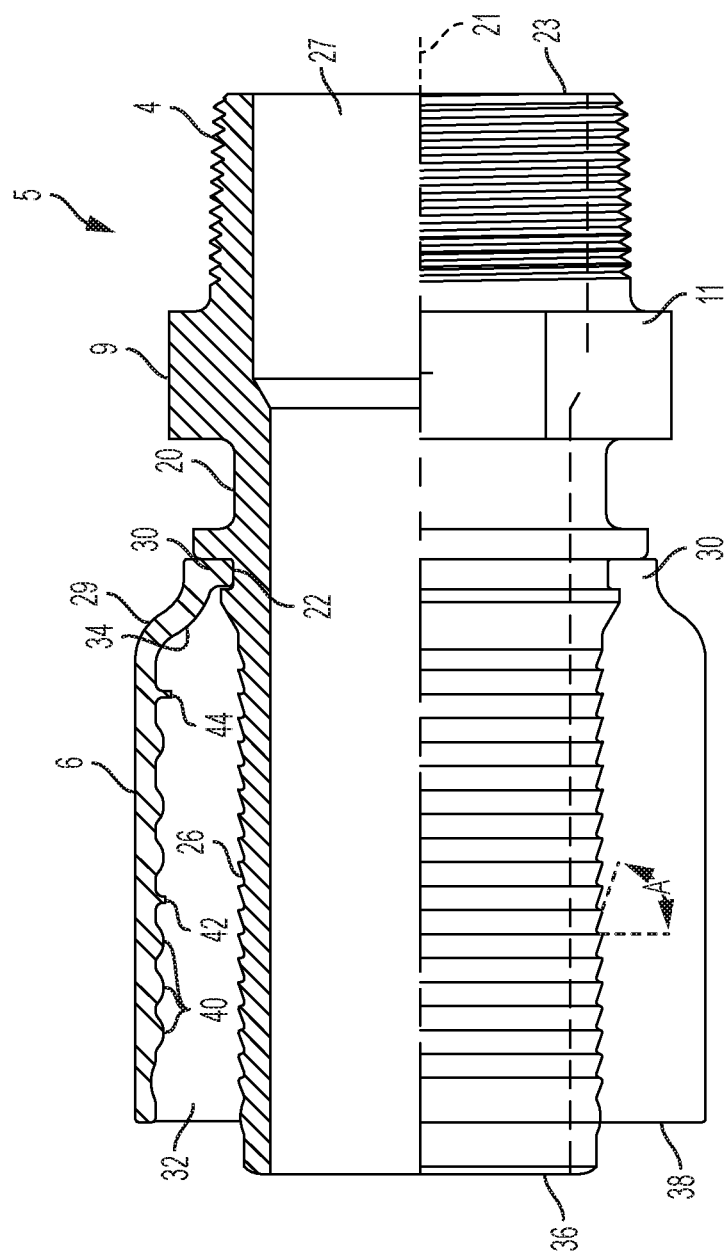
FIG. 2B depicts a partial cross-sectional view of the coupler of FIG. 2A taken along the lines 2B-2B, wherein various surface of the coupler are cut-away to reveal interior features of the coupler.

The features of the individual components of the coupler 5 will be described hereinafter with reference to FIGS. 2A and 2B. FIG. 2A is a bottom plan view of the coupler 5, according to a first example of the invention; and FIG. 2B is a partial cross-sectional view of the coupler 5 of FIG. 2A taken along the lines 2B-2B. Various surfaces are hidden in FIG. 2B to reveal interior features of the coupler 5.

Unless noted otherwise, the individual components and features of the coupler 5 are substantially cylindrical and are revolved about a longitudinal axis 21. Also, as used herein, the term "proximal" refers to either a location or a direction towards the mating surface 23 of the coupler 5, and the term "distal" refers to either a location or a direction away from the mating surface 23 of the coupler 5.

The coupler 5 generally comprises a hose adapter 20 and a ferrule 6 that is mounted in an annular recess 22 formed on an exterior surface of the hose adapter 20. The individual components of the coupler 5 may be composed of zinc plated wrought steel, zinc plated cast ductile iron, or stainless steel, for example, or any other material that is known to those of ordinary skill in the art.

The hose adapter 20 includes a substantially cylindrical body having a hollow interior region 27 through which fluid may pass. The revolved interior surface of the hose adapter 20 is smooth to limit the build-up of media thereupon. The inner diameter of the hose adapter 20 is larger at its proximal end than at its distal end.

The proximal end of the revolved exterior surface of the hose adapter 20 includes a connector 4 comprising male mechanical threads for releasably connecting to a female threaded connector, such as the female threaded connector 3 in FIG. 1. Those of ordinary skill in the art will recognize that the connection means at the proximal end of the hose adapter 20 may vary from that which is shown and described. For example, although not shown, the connector 4 may be a clip, clamp, barb, fastener, or mating surface.

The connector 4 terminates at a flange 9 that is formed on the exterior surface of the hose adapter 20 at a location distal of the connector 4. The exterior surface of the flange 9 may include one or more flat surfaces 11 for accommodating a standard tool, such as a wrench.

The tool is used to mount the coupler 5 to a mating connector, such as the female threaded connector 3 in FIG. 1. For example, the outer surface of the flange 9 may be hexagonal.

The recess 22 is formed on the exterior surface of the hose adapter 20 at a location distal of the flange 9. The proximal end of the ferrule 6 is positioned in the recess 22, as shown in FIG. 2B.

The distal end of the revolved exterior surface of the hose adapter 20 includes a hose fitting 26. The hose fitting 26 is located at a position that is distal of the recess 22. The hose fitting 26 comprises a series of barbs that are spaced apart along the length of the distal end of the hose adapter 20. The barbs are configured to engage the interior surface of a hose, such as the hose 7 shown in FIG. 1. According to one example of the coupler 5, the hose fitting 26 is a 3 inch male NPT-style connector. Each barb includes a substantially planar surface that is orthogonal to the longitudinal axis 21, and an angled surface that extends from the exterior surface of the hose adapter 20 in a proximal direction (e.g., toward connector 4). The angled surface and the planar surface form an acute angle 'A.' The angle 'A' of the barbs substantially limits or prevents the hose 7 from moving in the distal direction and withdrawing from the coupler 5. Those of ordinary skill in the art will recognize that other hose fittings exist, and may be incorporated into the hose adapter 20 without departing from either the scope or the spirit of the invention.

The ferrule 6 has a substantially cylindrical body having a substantially constant wall thickness. The proximal end of the ferrule 6 includes a reduced-diameter frustoconical portion 29. The frustoconical portion 29 terminates at a flange 30. The flange 30 is positioned in the recess 22 of the hose adapter 20 such that the ferrule 6 is fixedly mounted to the hose adapter 20. The area of engagement between the recess 22 and the flange 30 may be referred to herein as the attachment point between the ferrule 6 and the hose adapter 20. The ferrule 6 may be connected to the hose adapter 20 by a crimping or swaging operation.

Figure 3:
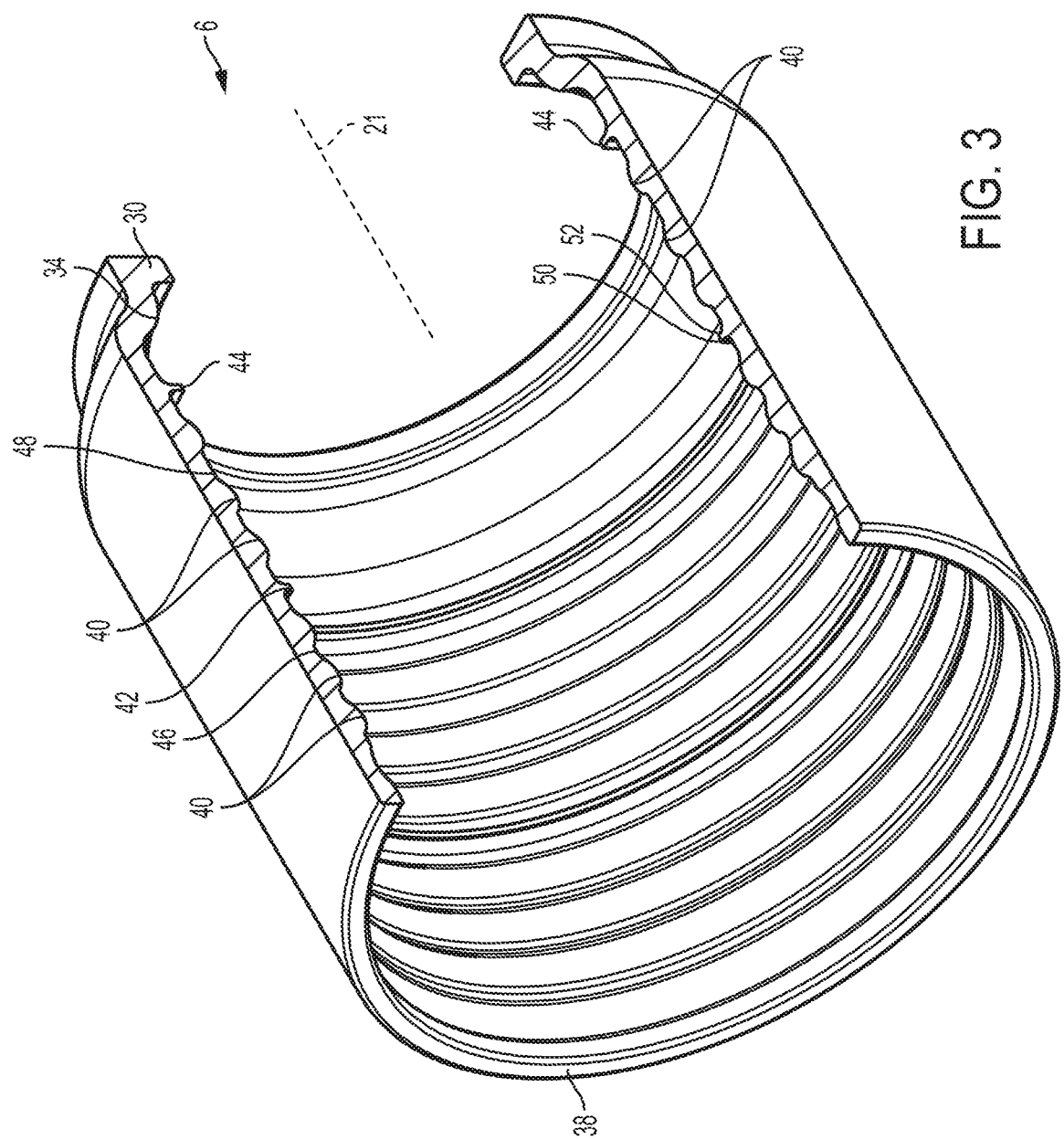
FIG. 3 depicts an isometric view of the ferrule of the coupler of FIG. 2A, which is shown partially cutaway.

FIG. 3 depicts a perspective view of the ferrule 6, which is shown partially cutaway. The revolved exterior surface of the ferrule 6 is substantially flat. In contrast, the revolved interior surface of the ferrule 6 includes a series of compression ribs 40 and cutting ribs 42 and 44.

The compression ribs 40 are spaced apart along the length of the ferrule 6. The spacing of the ribs 40 may be uneven, as shown, or even. Each compression rib 40 includes a rounded convex surface having a radius. The radius of each compression rib 40 may be equal, as shown, or the radii may differ. There are no sharp edges or surfaces formed on the compression ribs 40.

The spacing between adjacent ribs 40 generally decreases from the proximal to distal ends of the ferrule 6. The annular surface 48 between adjacent compression ribs 40 at the proximal end of the ferrule 6 is substantially flat, whereas, a concave valley 46 having a radii matching that of the compression ribs 40 is formed between adjacent compression ribs 40 at the distal end of the ferrule 6. The number of compression ribs 40 may vary. According to this example, the geometry of the ribs 40 differs from that of the barbs of the hose fitting 26.

The cutting rib 42 is positioned in a central region of the ferrule 6 at a location between adjacent compression ribs 40. The cutting rib 42 comprises a flat annular surface 50 extending from the interior of the ferrule 6 and facing the longitudinal axis 21. The flat annular surface 50 extends parallel to the longitudinal axis 21 of the coupler 5. A sharp corner 52 is formed on both sides of the flat annular surface 50. The cutting rib 42 has a greater length than the compression ribs 40, i.e., the rib 42 extends closer to the longitudinal axis 21 than the ribs 40. Stated differently, the rib 42 extends further from the interior surface of the ferrule 6 than the compression ribs 40. The cutting rib 42 may be omitted from the ferrule 6, if so desired.

The cutting rib 44 is positioned at the proximal end of the ferrule 6 at a location that is proximal of the compression ribs 40 and the cutting rib 42. Like the cutting rib 42, the cutting rib 44 comprises a flat annular surface extending from the interior of the ferrule 6 and facing the longitudinal axis 21, and a sharp corner is formed on both sides of the flat annular surface. The flat annular surface extends parallel to the longitudinal axis 21 of the coupler 5. The cutting rib 44 has a greater length, i.e., extends further from the interior surface of the ferrule 6 toward the axis 21, than the cutting rib 42 and the compression ribs 40. According to this example, the geometry of the ribs 44 and 42 differs from that of the barbs of the hose fitting 26.

The purpose of each rib 40, 42 and 44 is described with reference to the process of swaging the ferrule which is discussed hereinafter.

In an assembled and pre-swaged configuration of the coupler 5, an annular space 32 is formed between the interior surface of the ferrule 6 and the exterior surface of the distal end of the hose adapter 20. The distal end 36 of the hose adapter 20 extends beyond the distal end 38 of the ferrule 6 for at least the purpose of initially locating the bore of the hose 7 on the hose adapter 20 prior to advancing the hose 7 into the annular space 32. Although not shown, the end of the hose 7 may bear on the interior surface 34 at the proximal end of the ferrule 6.

To mount the hose 7 to the coupler 5, the hose 7 is first slid over the hose adapter 20 and delivered into the annular space 32 until the free end of the hose 7 either contacts or approaches the interior surface 34 of the ferrule 6. The ferrule 6 is then placed in a swaging tool which reduces the diameter of the ferrule 6, thereby compressing the wall of the hose 7 between the ferrule 6 and the hose fitting 26 of the hose adapter 20. The ferrule 6 is shown pre-swaged in the figures.

Upon swaging the ferrule 6, the cutting ribs 42 and 44 compress the hose 7 against the barbs of the hose fitting 26. The cutting ribs 42 and 44 pierce the outer surface of the hose 7 and physically contact and create electrical continuity with an interior shielding layer of the hose 7 (assuming that hose 7 has a shielding layer). Alternatively, the cutting rib 42 may not pierce the outer surface of the hose 7 depending on the diameters of the cutting rib 42 and the hose 7. The shielding layer may comprise a steel braid. A hose having a shielding layer is described in U.S. Pat. No. 3,684,602 to Ball, which is incorporated by reference herein in its entirety. The barbs of the hose fitting 26 either may or may not pierce the interior surface of the hose 7.

The ribs 42 and 44 and the barbs of the hose fitting 26 help to retain the hose 7 in its assembled position within the coupler 5 and also prevent delamination of the hose layers under high temperature and/or pressure conditions. It should be understood that the rib 44 pierces the hose 7 at a depth greater than that of the rib 42.

The compression ribs 40 are dimensioned to compress the hose 7 against the barbs of the hose fitting 26 without piercing the outer surface of the hose 7. The hose 7 can expand within the valleys 46 and spaces formed between the various compression ribs 40. The ribs 40 and valleys 46 also help to retain the hose 7 in its assembled position within the coupler 5.

The length of the hose 7 that is contained within the annular space 32 is subjected to a non-uniform pressure. More particularly, the engineered combination of high compression areas created by the radiused ribs 40 and the cutting ribs 42 and 44 along with the low compression areas created by the valleys 46 and 48 permit controlled expansion of the hose 7 during periods of high temperature and/or pressure conditions without compromising the integrity of the vulcanization between the various layers (e.g., rubber and steel braid layers) of the hose 7.

Although the invention is illustrated and described herein with reference to specific examples, the invention is not intended to be limited to the details shown. Rather, various modifications may be made in the details within the scope and range of equivalents of the claims and without departing from the invention. For example, the diameter and length of the various components of the coupler 5 may vary to conform to different hose sizes. As another example, the compression ribs and/or the cutting ribs may extend continuously around the entire inner circumference of the ferrule 6, or they may be non-continuous and extend around one or more portions of the inner circumference of the ferrule 6. Similarly, one or more barbs of the hose fitting 26 may extend continuously around the entire outer circumference of the hose fitting 26, or they may be non-continuous and extend around one or more portions of the outer circumference of the hose fitting 26.

What is claimed is:

1. A hose coupler comprising:
   a hose adapter including opposing ends, an interior surface forming a fluid passage between the opposed ends, and an exterior surface including a series of barbs for engaging an interior surface of a hose; and
   a ferrule having a proximal end connected to the hose adapter at an attachment point and a distal end defining an opening through which the hose is inserted, the ferrule being positioned to at least partially surround the exterior surface of the hose adapter, the ferrule having an interior surface facing the exterior surface of the hose adapter, the ferrule defining at least one cutting rib extending from the interior surface of the ferrule and having a sharp corner or edge for piercing an outer layer of the hose, and the ferrule defining a plurality of compression ribs located distally of the at least one cutting rib, wherein an entirety of each compression rib is a rounded surface extending from the interior surface of the ferrule for compressing the hose against the series of barbs, wherein the at least one cutting rib extends closer toward a longitudinal axis of the hose adapter than the plurality of compression ribs,
   wherein the ferrule is moveable between a pre-swaged configuration in which the at least one cutting rib faces the outer layer of the hose, and a swaged configuration in which the at least one cutting rib pierces the outer layer of the hose.

2. The hose coupler of claim 1, wherein an annular space is formed between the interior surface of the ferrule and the exterior surface of the hose adapter that is sized for receiving the hose, and the hose adapter includes a connector at a proximal end for attachment to a second hose.

3. The hose coupler of claim 2, wherein a distal end of the hose adapter extends to a length beyond a distal end of the ferrule, in order to facilitate insertion of the hose in the annular space.

4. The hose coupler of claim 1, wherein each barb extends from the exterior surface of the hose adapter in a direction towards said attachment point.

5. The hose coupler of claim 1, wherein the compression ribs and the at least one cutting rib of the ferrule are positioned to face the series of barbs of the hose adapter.

6. The hose coupler of claim 1 further comprising at least two cutting ribs.

7. The hose coupler of claim 6, wherein one or more of the compression ribs are positioned between the cutting ribs.

8. The hose coupler of claim 6, wherein the cutting ribs extend to different depths as measured from the interior surface of the ferrule.

9. The hose coupler of claim 8, wherein the cutting rib closest to the attachment point has a greater depth than the cutting rib that is positioned further away from the attachment point.

10. The hose coupler of claim 1, wherein the compression ribs are spaced apart non-uniformly along a length dimension of the ferrule.

11. The hose coupler of claim 1, wherein a spacing distance between adjacent compression ribs increases in a direction toward the attachment point.

12. The hose coupler of claim 1, wherein a compression rib is positioned on both sides of the at least one cutting rib.

13. The hose coupler of claim 1, wherein the ferrule includes a flange for connecting to the hose adapter, and the at least one cutting rib is positioned closer to the flange than the plurality of compression ribs.

14. The hose coupler of claim 1, wherein the ferrule includes another plurality of compression ribs located proximally of the at least one cutting rib.

15. A ferrule for mounting a hose to a hose adapter, said ferrule comprising:
    a cylindrical hollow structure having a longitudinal axis and extending between a proximal end and a distal end, the distal end defining an opening through which the hose is inserted,
    an attachment surface at the proximal end of the ferrule that is configured to be connected to the hose adapter,
    wherein an interior surface of the ferrule, which is positioned to face the hose adapter, includes at least one cutting rib having a sharp corner or edge for piercing an outer layer of the hose and a plurality of compression ribs located distally of the at least one cutting rib,
    wherein an entirety of each compression rib is a rounded surface extending from the interior surface of the ferrule for compressing the hose against the hose adapter,
    wherein the at least one cutting rib extends closer toward the longitudinal axis than the compression ribs.

16. The ferrule of claim 15 further comprising at least two cutting ribs.

17. The ferrule of claim 16, wherein one or more of the compression ribs are positioned between the cutting ribs.

18. The ferrule of claim 16, wherein the cutting ribs extend to different depths as measured from the interior surface of the ferrule.

19. The ferrule of claim 18, wherein a first cutting rib of the at least two cutting ribs that is positioned at the proximal end of the ferrule has a greater depth than a second cutting rib of the at least two cutting ribs that is positioned distal of the first cutting rib.

20. The ferrule of claim 15, wherein the compression ribs are spaced apart non-uniformly along a length dimension of the ferrule.

21. The ferrule of claim 15, wherein a spacing distance between adjacent compression ribs increases in a proximal direction.

22. The ferrule of claim 15, wherein the at least one cutting rib is positioned closer to the attachment surface than the plurality of compression ribs.

23. The ferrule of claim 15, wherein the ferrule includes another plurality of compression ribs located proximally of the at least one cutting rib.

* * * * *